United States Patent [19]
Hwang

[11] Patent Number: 6,061,318
[45] Date of Patent: *May 9, 2000

[54] METHOD FOR DISCRIMINATING A TYPE OF A DISC AND A DIGITAL VERSATILE DISC SYSTEM ADOPTING THE SAME

[75] Inventor: In-Wook Hwang, Suwon, Rep. of Korea

[73] Assignee: Samsung Electronics Co., Ltd., Suwon, Rep. of Korea

[*] Notice: This patent is subject to a terminal disclaimer.

[21] Appl. No.: 08/956,038

[22] Filed: Oct. 24, 1997

[30] Foreign Application Priority Data

Oct. 24, 1996 [KR] Rep. of Korea .................. 96-48021

[51] Int. Cl.⁷ .................. G11B 3/90; G11B 7/00
[52] U.S. Cl. .................. 369/58; 369/44.25; 369/44.27
[58] Field of Search .................. 369/54, 58, 94, 369/112, 44.27, 43, 44.25, 44.26, 44.29, 44.35, 47, 48, 50

[56] References Cited

U.S. PATENT DOCUMENTS

| | | | |
|---|---|---|---|
| 5,003,521 | 3/1991 | Yoshida et al. | 369/54 X |
| 5,235,581 | 8/1993 | Miyagawa et al. | 369/58 X |
| 5,289,451 | 2/1994 | Ashinuma et al. | 369/58 |
| 5,665,957 | 9/1997 | Lee et al. | 369/58 X |
| 5,748,597 | 5/1998 | Kim | 369/94 |
| 5,831,952 | 11/1998 | Yamada et al. | 369/58 |

*Primary Examiner*—Paul W. Huber
*Attorney, Agent, or Firm*—Staas & Halsey LLP

[57] ABSTRACT

A digital versatile disc (DVD) system compatible with a compact disc (CD), a single-layered DVD and a multi-layered DVD having respectively different structures. The DVD system discriminates a type of a disc loaded on a turntable according to the time and number represented by reflection characteristic curves of a focus error signal detected during performing an initial focus search operation for the disc. The DVD system calculates the size of a waveform of the focus error signal having a reflection characteristic curve obtained from a reflection layer of the disc in a focus-up section, and determines the disc as a multi-layered DVD having two reflection layers when two reflection characteristic curves exist and have a magnitude which is between a first reference value and a second reference value. Otherwise, the DVD system determines the disc as a CD being relatively thicker if the detection time of a reflection characteristic curve is longer than a predetermined time, and determines the disc as a single-layered DVD if the detection time is shorter than the predetermined time, based on the comparison result between the detection time of the reflection characteristic curve and the predetermined time. The DVD system quickly discriminates between a CD and a DVD, thereby providing an effect that error caused during performing a playback operation can be reduced in the DVD system compatible with the DVD and the CD.

43 Claims, 8 Drawing Sheets

SINGLE-LAYERED DVD

FIG. 2B

MULTI-LAYERED DVD

METHOD FOR DISCRIMINATING A TYPE OF A DISC AND A DIGITAL VERSATILE DISC SYSTEM ADOPTING THE SAME

BACKGROUND OF THE INVENTION

1. Field of the Invention

The present invention relates to a method of discriminating a type of a disc and a digital versatile disc system adopting the same, and more particularly, to a method for automatically discriminating a type of a disc using a focus error signal detected during performing a focus search operation for the disc, to enable a playback operation of the disc to be performed in a proper way, and a digital versatile disc system adopting the same.

2. Description of the Related Art

A digital versatile disc (DVD) can record a large amount of information and provide a high picture quality in comparison with a compact disc (CD). As a result, a DVD has come into the spotlight as a storage medium of the next generation.

Most DVD systems for playing back a DVD include an optical pick-up compatible with a DVD and a CD so that signals recorded on the DVD, as well as on the CD having a relatively large track pitch, can be reproduced. The DVD system including the optical pick-up compatible with the DVD and the CD should discriminate whether a disc to be reproduced is the DVD or the CD prior to reproduction of the disc.

SUMMARY OF THE INVENTION

Thus, it is an object of the present invention to provide a method for quickly discriminating a type of a disc using the time that a reflection characteristic curve of a focus error signal is detected during performing an initial focus search operation for the disc, to thereby enable a playback operation of the disc to be performed properly.

Another object of the present invention is to provide a digital versatile disc (DVD) system adopting the above method.

Additional objects and advantages of the invention will be set forth in part in the description which follows and, in part, will be obvious from the description, or may be learned by practice of the invention.

The foregoing and other objects of the present invention are achieved by providing a method of discriminating a type of an optical disc loaded into a digital versatile disc system which can reproduce a plurality of optical discs having different signal record layers with a single optical pickup, the method for discriminating the type of the optical disc comprising the steps of (a) detecting a focus error signal having desired waveforms from a signal picked up from the loaded optical disc in a focus-up state during performing an initial focus search operation for the loaded optical disc; (b) comparing a magnitude of the focus error signal in step (a) with predetermined reference values; (c) determining which of a reflection characteristic (S-shaped) curve having a minute level produced by reflection from the surface of substrate of an optical disc, a reflection characteristic curve having a magnitude between predetermined reference values produced by a reflection layer of the optical disc and a reflection characteristic curve having a magnitude larger than the reference values is the focus error signal detected in step (a), based on the comparison result in step (b), and setting the time elapsed after a focus-up operation; (d) counting the number of times when the focus error signal detected in step (a) is determined as the reflection characteristic curve having the magnitude between the reference values in step (c); (e) comparing the number of times counted in step (d) with a predetermined number, and the time elapsed set in step (c) with a predetermined critical time, respectively, in the condition that a focus-up operation is completed; and (f) determining whether the optical disc loaded is a single-layered DVD, a multi-layered DVD or a CD, based on the comparison results in step (e).

The foregoing objects of the present invention are also achieved by providing a digital versatile disc (DVD) system comprising a compatible optical pick-up for DVD/CD; a focus error signal detector to detect a focus error signal from a signal read from a loaded optical disc via the optical pick-up; a servo signal processor to generate a control signal for the control of a focus servo operation, and to discriminate a type of the disc, using the time and number represented by a reflection characteristic curve formed from the focus error signal detected by the focus error signal detector during performing an initial focus search operation; a controller to perform general control over the system so that a playback operation of the optical disc is performed properly according to the discrimination result in the servo signal processor of the type of the optical disc; and a driving unit to output a driving signal of the optical pick-up corresponding to the focus servo control signal of the servo signal processor.

BRIEF DESCRIPTION OF THE DRAWINGS

The preferred embodiments are described with reference to the drawings wherein.

DETAILED DESCRIPTION OF THE PREFERRED EMBODIMENTS

The preferred embodiments of the present invention will be described with reference to the accompanying drawings.

Figure 1:
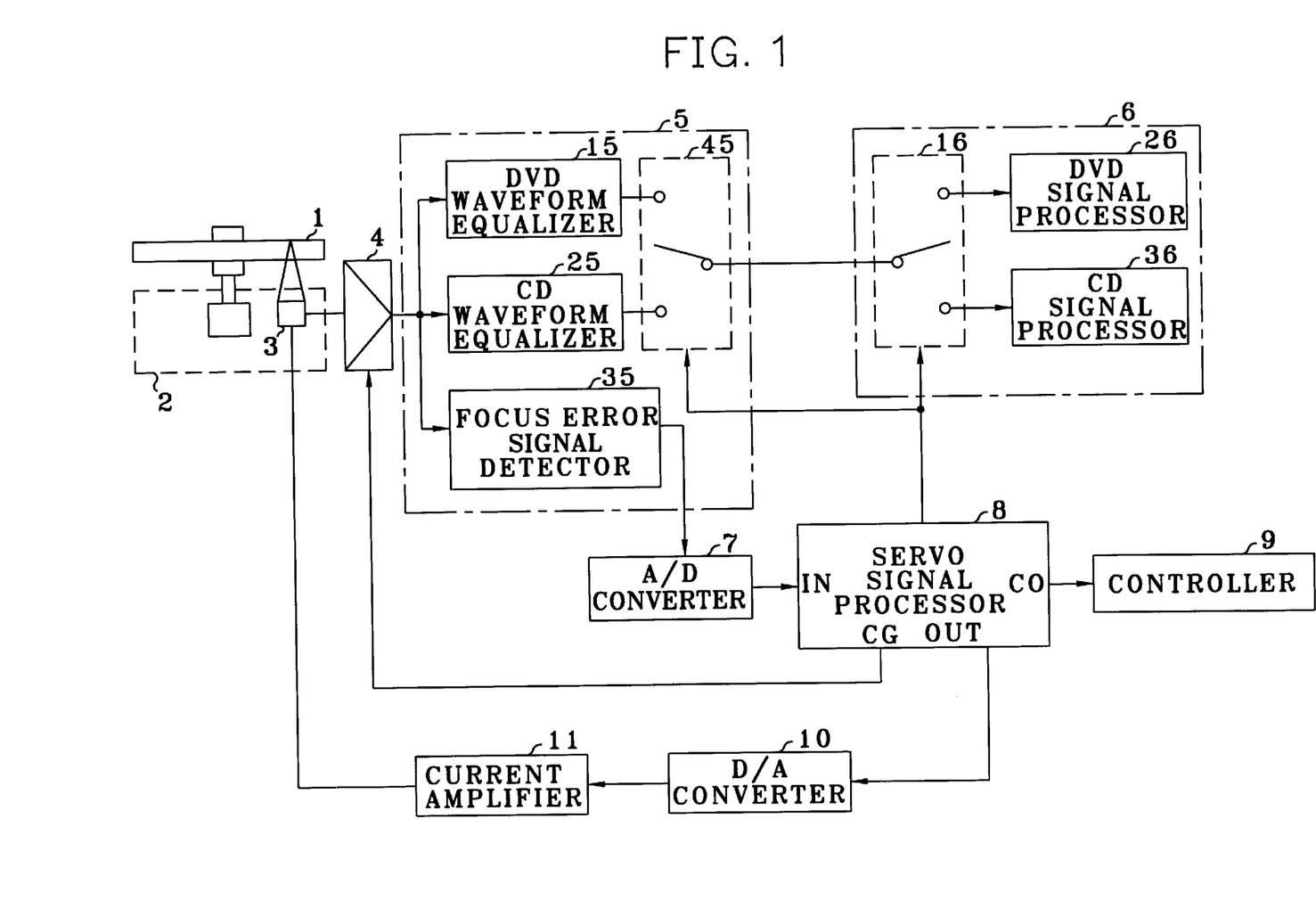
FIG. 1 is a block diagram illustrating a digital versatile disc (DVD) system according to an embodiment of the present invention.

FIG. 1 is a block diagram illustrating a digital versatile disc (DVD) system according to an embodiment of the present invention. The DVD system shown in FIG. 1 includes a deck mechanism 2 having an optical pick-up 3 for reading out a signal from a disc 1 loaded on a turntable (not shown), and a current-to-voltage conversion amplifier 4 for converting a radio frequency (RF) signal which is a high frequency signal in the form of a current and is read through the optical pick-up 3, into a signal in the form of a voltage, and amplifying the converted signal. The DVD system further comprises a radio frequency amplification unit 5 including a DVD waveform equalizer 15 and a compact disc waveform equalizer 25, each of which receives the RF signal amplified by the current-to-voltage conversion amplifier 4 and waveform-equalizes the received RF signal, and a focus error signal detector 35 for detecting a focus error signal from the RF signal. The RF amplification unit 5 includes a switch 45 for selectively outputting one of the waveform-equalized signals which are respectively waveform-equalized in the DVD waveform equalizer 15 and the CD waveform equalizer 25, according to a control signal based on a discrimination result of the type of the disc 1. Further, the DVD system includes a digital signal processor 6 including a DVD signal processor 26 for processing the waveform-equalized signal received through the switch 45 of the RF amplification unit 5 which complies with a DVD format and a CD signal processor 36 for processing the waveform-equalized signal which complies with a CD format. The digital signal processor 6 includes a switch 16 for selectively outputting the waveform-equalized signal received from the RF amplification unit 5 to the DVD signal processor 26 and the CD signal processor 36, according to the control signal based on the discrimination result of the type of the disc. An analog-to-digital converter 7 converts an analog focus error signal detected by the focus error signal detector 35 into a digital form. A servo signal processor 8 performs a servo control operation and discriminates a type of the disc 1 loaded on the turntable, using the time that a reflection characteristic curve is to be formed from the digital focus error signal received during performing an initial focus search operation. A controller 9 performs general control over the system so that a playback operation of the disc is performed properly according to the type of the disc discriminated by the servo signal processor 8. A digital-to-analog converter 10 converts a servo control signal generated by the servo signal processor 8 into an analog form. A current amplifier 11 outputs the analog servo control signal as a current command for driving the optical pick-up 3.

Figure 2A:
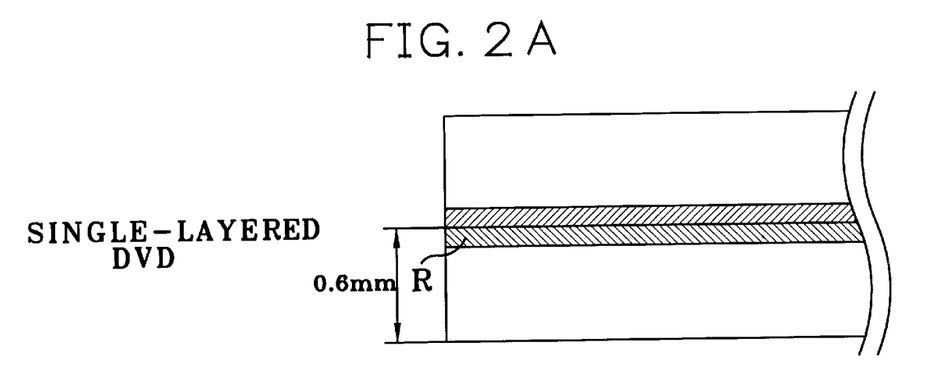
FIGS. 2A through 2C are cross-sectional structure views showing a single-layered DVD, a multi-layered DVD and a compact disc (CD), respectively.
Figure 2B:
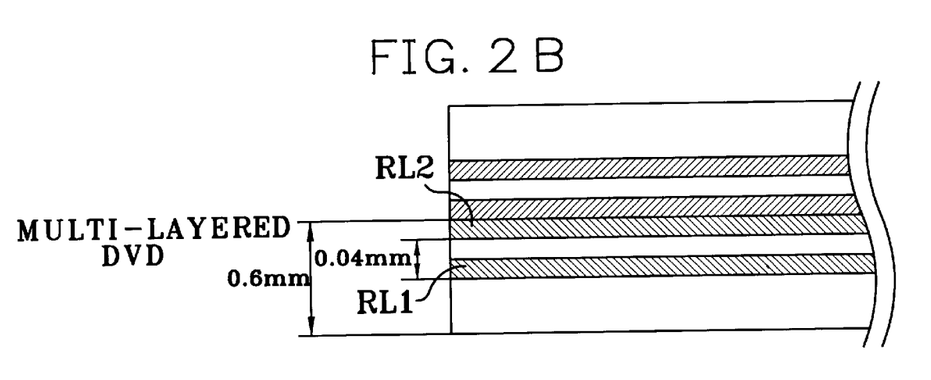
Figure 2C:
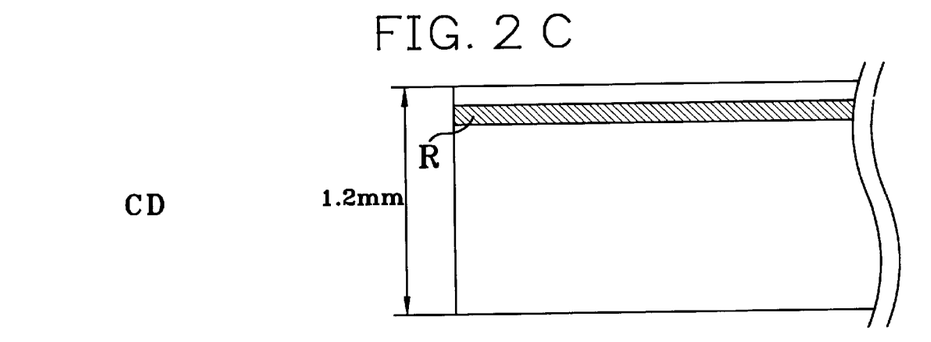

FIGS. 2A through 2C are cross-sectional structure views showing a single-layered DVD, a multi-layered DVD, and a CD. The single-layered DVD shown in FIG. 2A has a diameter of 120 mm, a substrate thickness of 0.6 mm and a recording capacity of 4.7 GB. The multi-layered DVD of FIG. 2B has a structure such that a thickness between a first signal reflection layer RL1 and a second signal reflection layer RL2 is 0.04 mm and a recording capacity is above 9.4 GB. The CD of FIG. 2C, as known, has a diameter of 120 mm, a substrate thickness of 1.2 mm which is relatively thicker than the DVD, and a recording capacity of 640 MB.

Figure 3A:
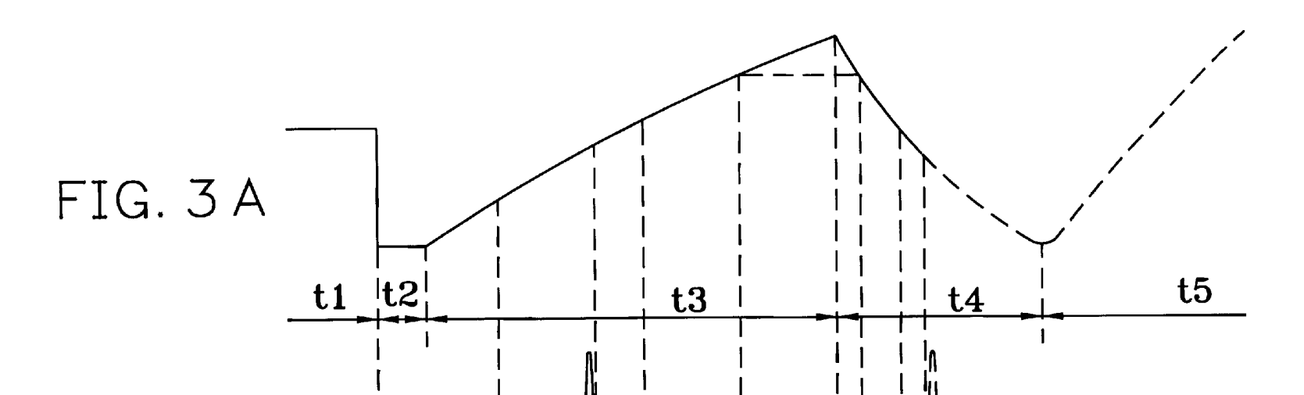
FIG. 3A is a waveform diagram of an output of a servo signal processor shown in FIG. 1 for a focus search operation.
Figure 3B:
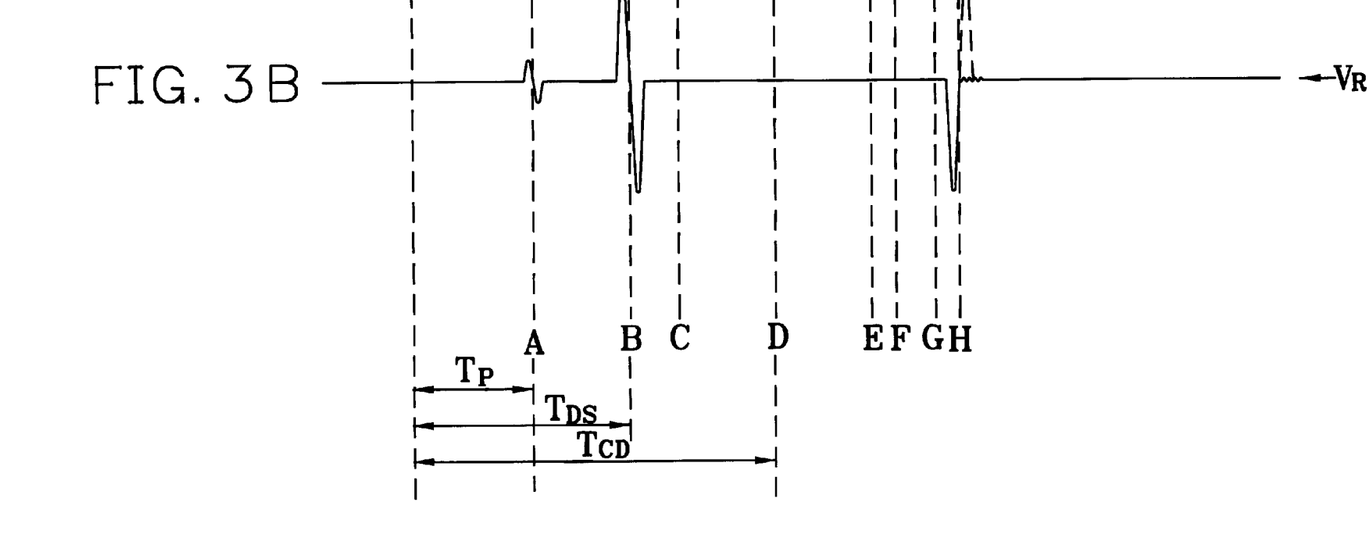
FIGS. 3B through 3D are waveform diagrams of a focus error signal detected during performing a focus search operation for the respective discs shown in FIGS. 2A through 2C, respectively.
Figure 3C:
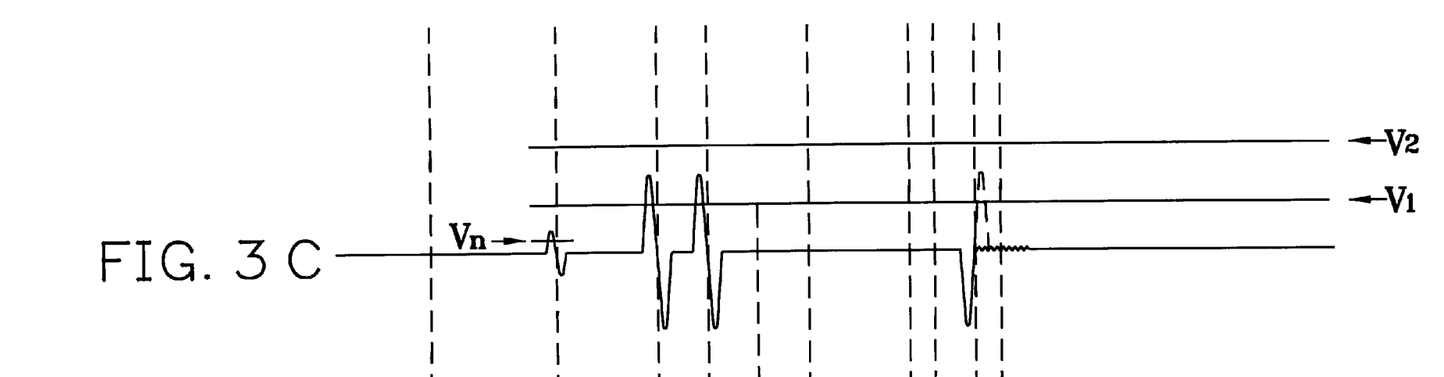
Figure 3D:
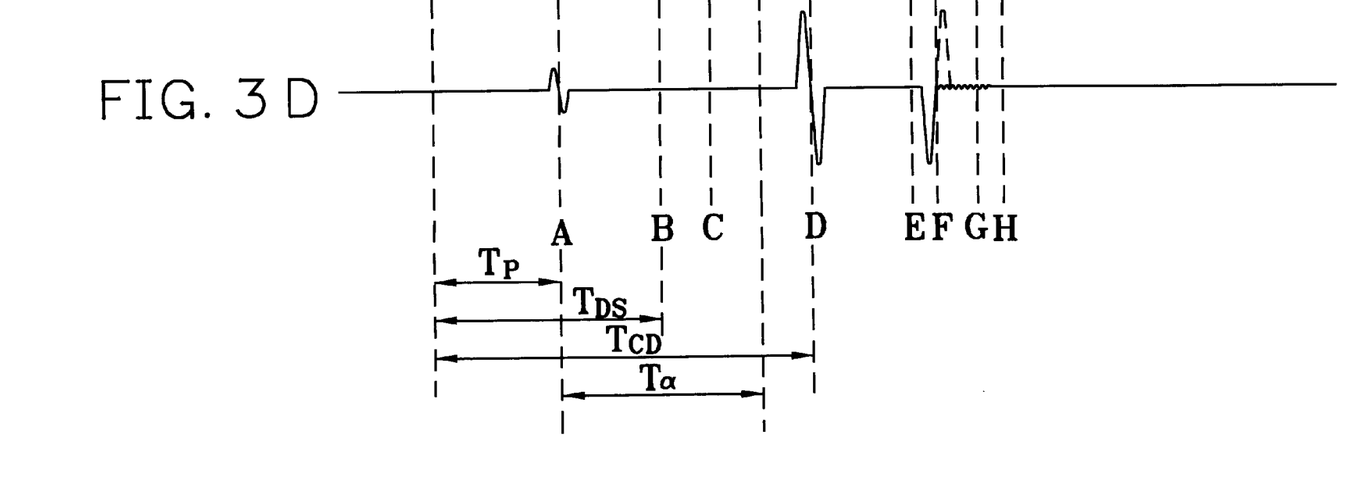

FIG. 3A is a waveform diagram of an output of the servo signal processor 8 for a focus search operation, and FIGS. 3B through 3D are waveform diagrams of a focus error signal detected by the focus error detector 35 during performing a focus search operation for the respective discs shown in FIGS. 2A through 2C.

A focus servo, which brings focus onto the reflecting surface of the disc 1, is used to continuously move an objective lens unit for the optical pick-up 3 which is wound with coils and is located in a magnetic field along the optical axis, so that the reflecting surface of the disc 1 is placed within a focal depth of the objective lens. When the disc 1 is loaded into the DVD system, the focus servo makes the objective lens move up and down with an oscillating frequency of 1~2 Hz. Accordingly, a focus error signal is generated because the reflecting surface of the disc 1 becomes close to the focal depth of the objective lens. Once the focus error signal is detected, the focus servo uses the focus error signal to make the objective lens be in a position within the focal depth. The detected focus error signal is represented as reflection characteristic curves shown in FIGS. 3B through 3D according to the type of the disc 1 loaded on the turntable. The reflection characteristic curves (also referred to as "S-shaped curves") of the focus error signal are produced by reflection from the surfaces and the signal recording layers of the CD and the single-layered and multi-layered DVDs.

The focus search operation waveform shown in FIG. 3A is generated for a focus-in operation by the servo signal processor 8. In the focus search operation waveform of FIG. 3A, a section t1 represents an initial stationary state, a section t2 represents a state that an objective lens is placed in the lowest position, a section t3 represents a focus-up state, a section t4 is a focus-down state, and a section t5 is a focus-up in the case that no focus-in operation is made.

FIG. 3B shows the waveform of a focus error signal detected during performing a focus search operation for the single-layered DVD. Referring to FIG. 3B, a reflection characteristic curve having a minute level is produced at a position 'A' of the section t3 which is a focus-up state and caused by reflection from the surface of a disc substrate. Another reflection characteristic curve having a relatively large level is produced at a position 'B' and caused by reflection from a signal reflection layer R, and half of the relatively large reflection characteristic curve is produced at a position 'H' during a focus-in operation in the section t4 which is a focus-down state.

FIG. 3C shows the waveform of a focus error signal detected during performing the focus search operation for the multi-layered DVD shown in FIG. 2B. Referring to FIG. 3C, a reflection characteristic curve of a minute level is produced at the position 'A' and caused by reflection from the surface of the disc substrate, and reflection characteristic curves having a level between two predetermined reference values V1 and V2 are produced respectively at positions 'B' and 'C' and caused by reflection from the first signal reflection layer RL1 and the second signal reflection layer RL2, respectively, and half of a reflection characteristic curve is at a position 'G' during a focus-in operation.

FIG. 3D shows the waveform of a focus error signal detected during performing the focus search operation for the CD shown in FIG. 2C. In FIG. 3D, a reflection characteristic curve having a minute level is reproduced at the position 'A' and caused by reflection from the surface of the disc substrate, and a reflection characteristic curve of a level between two reference values V1 and V2 is at a position 'D' and caused by reflection from the signal reflection layer, and half of the reflection characteristic curve is at a position 'F' during the focus-in operation.

As described above, the reflection characteristic curves of the focus error signal have different sizes at different positions according to the type of the discs. The present invention discriminates a type of a disc based on the differences as described above.

Returning to FIG. 1, when the disc 1 such as a DVD or a CD is loaded into the system shown in FIG. 1, the deck mechanism 2 rotates the disc 1. The DVD system drives the optical pick-up 3 when rotation of the disc 1 reaches a predetermined speed. The optical pick-up 3 reads out an RF signal from the rotating disc 1 and outputs the read signal to the current-to-voltage conversion amplifier 4. The current-to-voltage conversion amplifier 4 converts the received RF signal having the form of a current into a signal in the form of a voltage, and amplifies the converted signal at a constant amplification ratio to then output the amplified signal to the RF amplification unit 5. The DVD waveform equalizer 15 of the RF amplification unit 5 waveform-equalizes the received RF signal according to an EFM-plus modulation characteristic of a DVD. The CD waveform equalizer 25 waveform-equalizes the received RF signal according to an EFM modulation characteristic of a CD. The waveform-equalized RF signals by the DVD waveform equalizer 15 and the CD waveform equalizer 25 are input to the switch 45. Meanwhile, the focus error signal detector 35 of the RF amplification unit 5 detects the focus error signal from the received RF signal and outputs the detected signal to the A/D converter 7. The A/D converter 7 converts the input focus error signal into a digital form to be processed in the servo signal processor 8, and transmits the converted signal to an input terminal IN of the servo signal processor 8. The servo signal processor 8 discriminates a type of the disc 1 using the focus error signal received via the input terminal IN thereof. The discrimination of the type of the disc is described in more detail with reference to FIGS. 4A through 4C and FIG. 5.

Figure 4A:
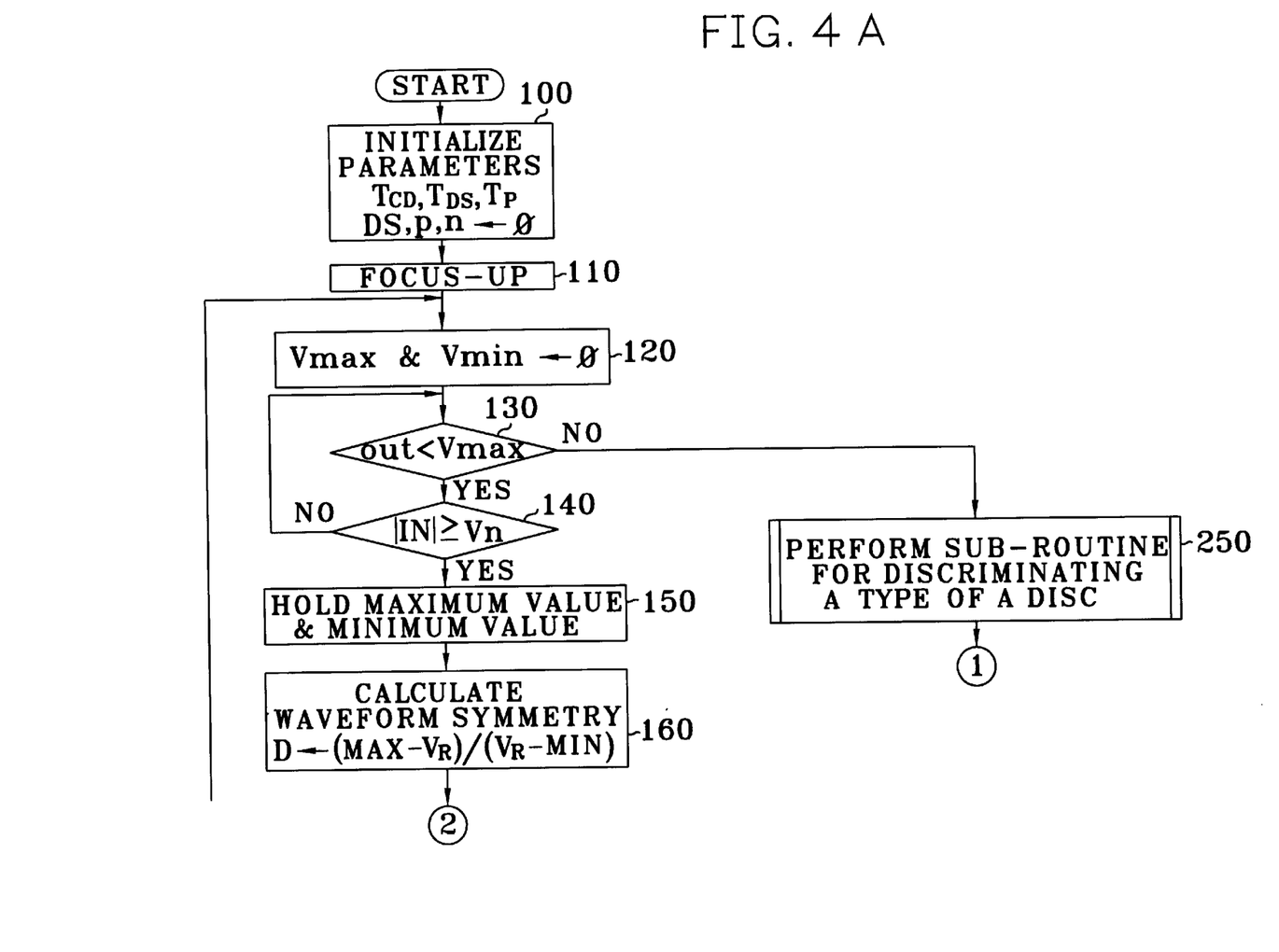
FIGS. 4A through 4C are flowcharts for explaining a focus servo operation of the DVD system shown in FIG. 1.
Figure 4B:
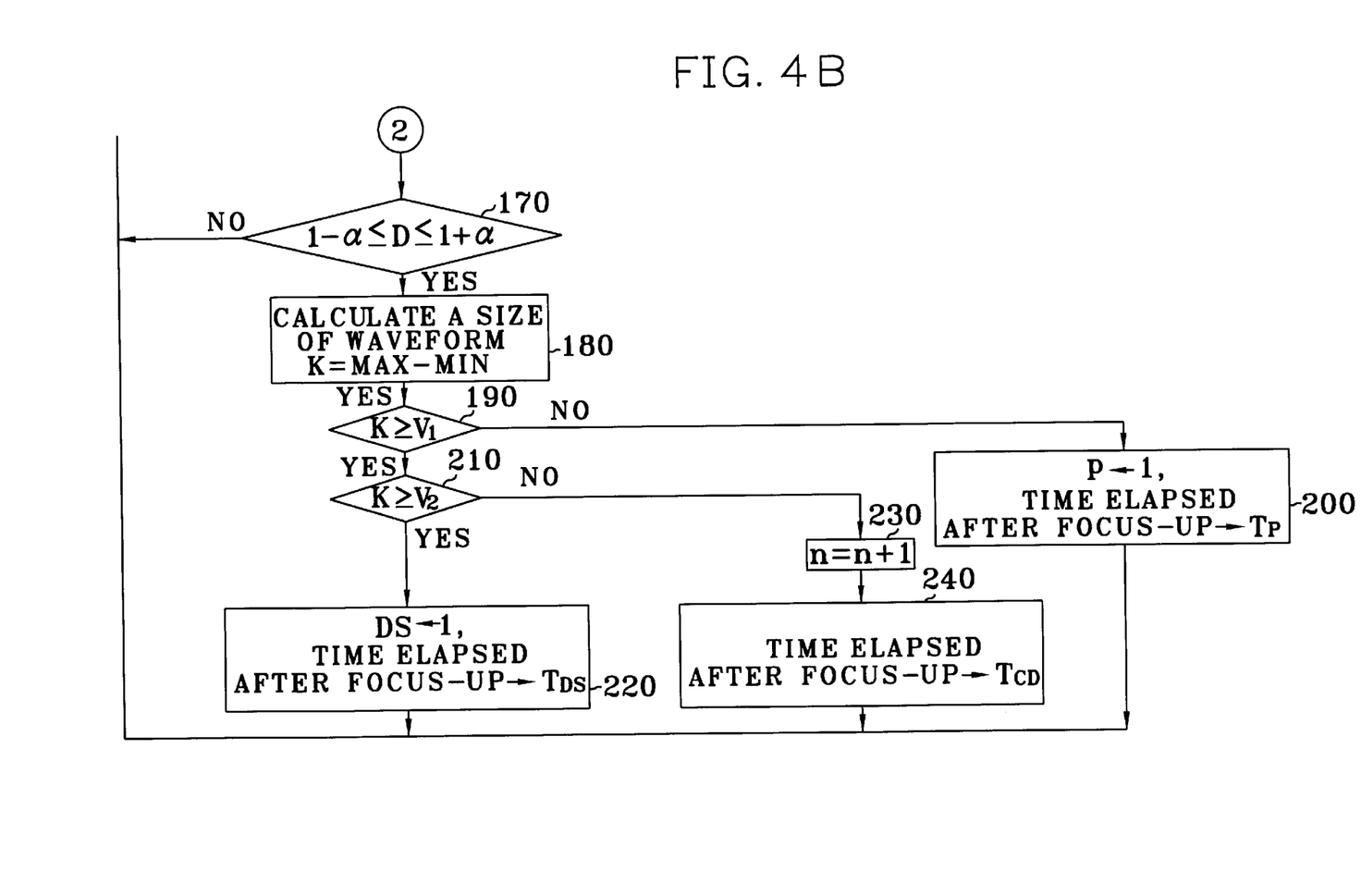
Figure 4C:
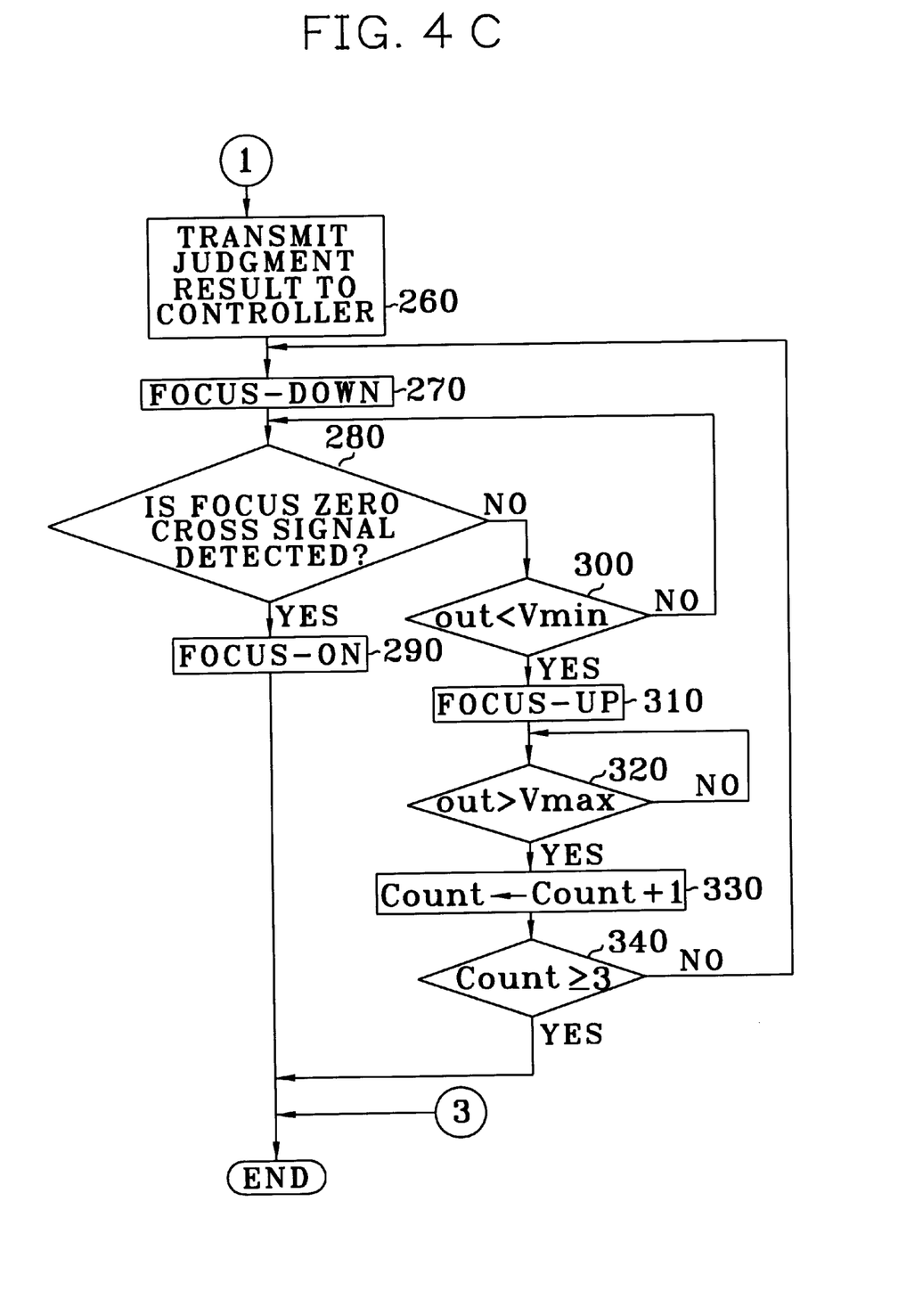
Figure 5:
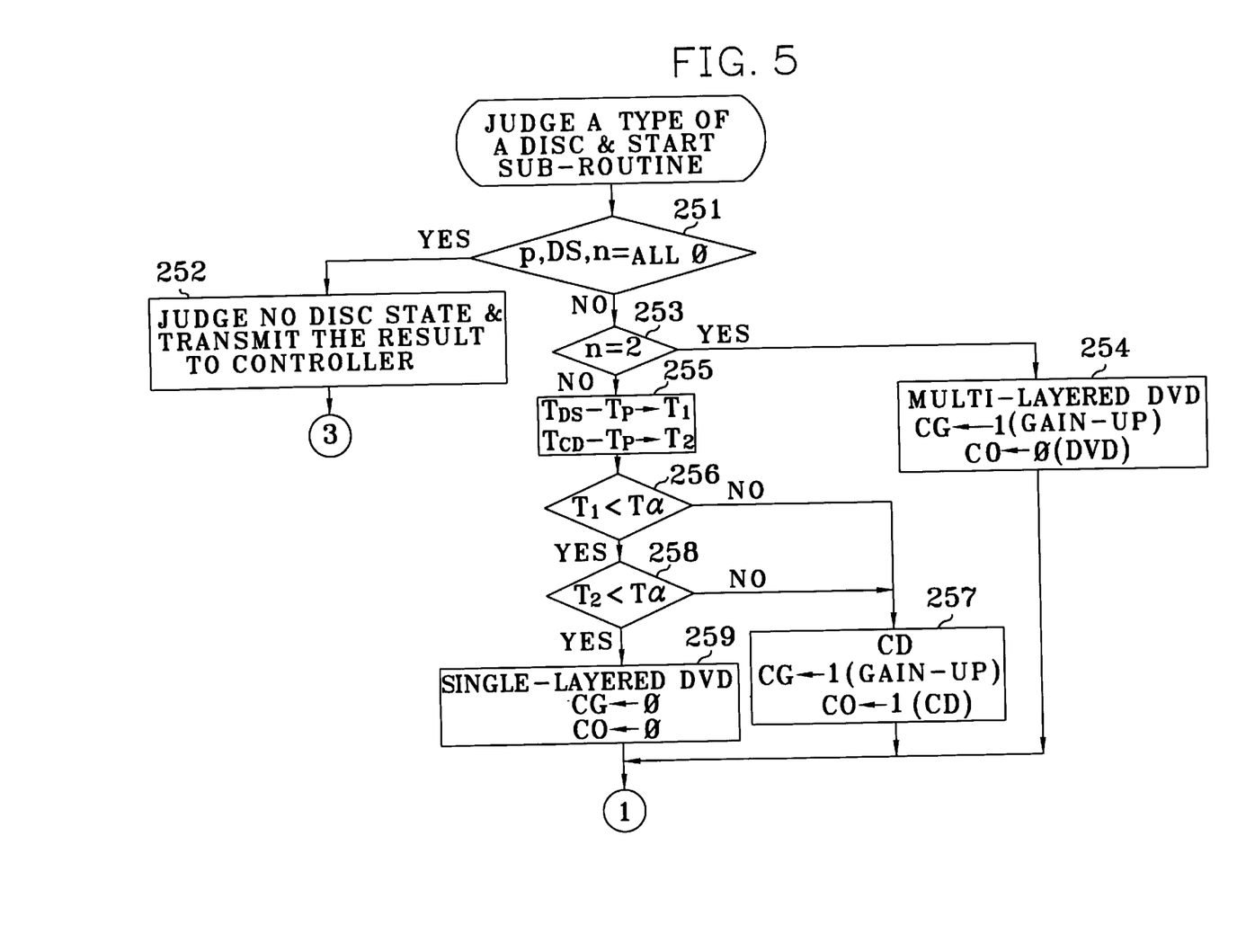
FIG. 5 is a flowchart for explaining a sub-routine for discriminating a type of a disc according to the focus servo operation shown in FIGS. 4A through 4C.

FIGS. 4A through 4C show flowcharts for explaining a focus servo operation of the system shown in FIG. 1, and FIG. 5 is a flowchart for explaining the sub-routine for discriminating a type of a disc according to the focus servo operation shown in FIGS. 4A through 4C.

Referring to FIGS. 4A through 4C, the servo signal processor 8 initializes, as "0", all parameters $T_{DS}$, $T_P$, $T_{CD}$, DS, p, and n necessary for discriminating a type of a disc in step 100, and generates the focus control signal for a focus-up state in step 110. The servo signal processor 8 initializes as "0", a maximum level value and a minimum level value of a focus error signal in step 120, and determines whether the level OUT of the focus control signal as the waveform shown in FIG. 3A is less than a predetermined maximum value Vmax in step 130. The servo signal processor 8 determines a current focus search operation section as being a focus-up state if the level of the focus control signal is less than the maximum value Vmax, while it determines a current focus search operation section as being a focus-up completion state if the level of the focus control signal is larger than or equal to the maximum value Vmax.

When the current focus search section is in a focus-up state in step 130, the servo signal processor 8 determines whether an absolute level |IN| of the focus error signal which is detected by the focus error signal detector 35 and is applied via the input terminal IN, is larger than or equal to noise voltage Vn in step 140. When the focus-up completion state is recognized in step 130, the servo signal processor 8 performs the sub-routine of FIG. 5 for discriminating a type of the disc in step 250.

The servo signal processor 8 performs the step 130 when an absolute level |IN| of the focus error signal is less than noise voltage Vn in step 140. When an absolute level |IN| of the focus error signal is larger than or equal to the noise voltage Vn in step 140, the servo signal processor 8 holds the maximum and minimum level values of the focus error signal in step 150. Then, the servo signal processor 8 uses the held maximum and minimum level values to calculate a symmetry factor D of waveform as expressed in the following equation (1):

$$D = (\text{maximum level value} - V_R)/(V_R - \text{Minimum level value}) \quad (1)$$

wherein, $V_R$ is a reference level.

The servo signal processor 8 determines whether the obtained waveform symmetry factor D is less than or equal to a constant critical value ($1-\alpha \leq D \leq 1+\alpha$) in step 170. The servo signal processor 8 determines that a desired reflection characteristic curve is not detected when the waveform symmetry factor D is not within a constant critical value, and performs the step 120. On the contrary, when the waveform symmetry factor D is within a constant critical value, the servo signal processor 8 determines that a desired reflection characteristic curve is detected, and performs step 180 for calculation of a size of the waveform. In step 180, the servo signal processor 8 calculates a waveform size K expressed as a difference between the held maximum level value and minimum level value. The servo signal processor 8 determines whether the calculated waveform size K is larger than or equal to a first reference value $V_1$ ($K \geq V_1$) in step 190. If the waveform size K is less than the first reference value $V_1$, the servo signal processor 8 sets to "1" a parameter P representing that the focus error signal corresponding to the calculated waveform size K has the minute reflection characteristic curve reproduced by reflection from a surface of the disc substrate in a focus-up initial state, and at this time sets the time elapsed after a focus-up operation on the corresponding parameter $T_p$ in step 200, to then perform step 120. If the waveform size K is larger than or equal to the first reference value $V_1$ in step 190, the servo signal processor 8 determines whether the waveform size K is larger than or equal to a second reference value $V_2$ in step 210.

Here, the first reference value $V_1$ and the second reference value $V_2$ are values for discriminating a single-layered DVD, a multi-layered DVD and a CD, in which the reflection characteristic curves have different levels as shown in FIGS. 3B through 3D, and the first reference value $V_1$ is less than the second reference value $V_2$. If the waveform size K is smaller than the second reference value $V_2$ in step 210, the servo signal processor 8 determines that the focus error signal corresponding to the calculated waveform size K has the reflection characteristic curve which is produced by the reflection layer of the multi-layered DVD and has a magnitude between the first reference value $V_1$ and the second reference value $V_2$ or the CD, and increases the number 'n' of detection of the waveform by "1" (n=n+1) in step 230, which is intended to discriminate the multi-layered DVD and the CD. Then, the servo signal processor 8 sets the time elapsed after a focus-up operation on the corresponding parameter $T_{CD}$ in step 240 and then performs step 120. If the waveform size K is larger than or equal to the second reference value $V_2$ in step 210, the servo signal processor 8 sets to "1" a parameter representing that the focus error signal corresponds to the waveform size that has the reflection characteristic curve having a large level produced by the reflection layer of the single-layered DVD, and sets the time elapsed after the focus-up operation on the corresponding parameter $T_{DS}$ in step 220, to then perform the step 120.

Referring to FIG. 5 illustrating the sub-routine for discriminating a type of the disc 1 in step 250, the servo signal processor 8 determines whether the parameters 'p', 'DS' and 'n' necessary for discriminating a type of the disc are all zeros in step 251. When the parameters 'p', 'Ds' and 'n' are all zero, the servo signal processor 8 determines that there is no disc on the turntable and informs the controller 9 of this fact in step 252. When not all of the parameters 'p', 'Ds' and 'n' are zero in step 251, the servo signal processor 8 determines whether the number 'n' of detection of the focus error signal of the reflection characteristic curve is "2" in step 253. When the number of detection of the focus error signal of the reflection characteristic curve is "2", the servo signal processor 8 determines it as the multi-layered DVD being loaded, outputs to the current-to-voltage conversion amplifier 4 a control signal CG of a high level expressed as a binary signal of "1" for gain-up, and informs the controller 9 of the discrimination result, and at the same time, outputs a control signal CO of a low level expressed as a binary signal of "0" in order to control the switching operation of the switches 45 and 16, in step 254. When the number 'n' of detection of the focus error signal of the reflection characteristic curve is not "2" in step 253, the servo signal processor 8 calculates the differential time between the time elapsed $T_{DS}$ and $T_{CD}$ until detection of the reflection characteristic curve from the focus-up state and the time elapsed $T_P$ until detection of the reflection characteristic curve having a minute level from the focus-up state in step 255, in which $T_{DS}-T_P=T_1$, $T_{CD}-T_P=T_2$. The servo signal processor 8 determines whether the differential time $T_1$ is less than a critical time $T_\alpha$ in step 256.

Here, the critical time $T_\alpha$ is set to the time from a point when the reflection characteristic curve of the minute level produced by reflection from the surface of the disc substrate is detected, to a middle point between the points when the reflection characteristic curves produced by the reflection layers of the single-layered DVD and the CD are detected, to distinguish times of the focus error signals of the reflection characteristic curve detected from the single-layered DVD and the CD which have a single reflection layer R in the focus-up state. Also, the critical time $T_\alpha$ is adaptively set according to the degree of a slope of the focus search operation waveform shown in FIG. 3A, such as sharp, moderate and gentle slopes.

When the first differential time $T_1$ is larger than the critical time $T_\alpha$ in step 256, the servo signal processor 8 determines that the loaded disc is a CD having a relatively thicker thickness, and then outputs the control signal CG of a high level to the current-to-voltage conversion amplifier 4 and outputs the control signal CO of a high level to the controller 9 and the switches 45 and 16, in step 257. When the first differential time $T_1$ is less than the critical time $T_\alpha$, in step 256, the servo signal processor 8 determines whether the second differential time $T_2$ is less than the critical time $T_\alpha$ in step 258. If the second differential time $T_2$ is not less than the critical time $T_\alpha$, the servo signal processor 8 determines that the loaded disc is a CD and executes the process of step 257. On the contrary, if the second differential time $T_2$ is less than the critical time $T_\alpha$, the servo signal processor 8 determines that the loaded disc is a single-layered DVD, and then outputs the control signal CG of a low level expressed as a binary signal of "0" to the current-voltage conversion amplifier 4 and outputs the control signal CO of a low level to the controller 9 and the switches 45 and 16 in step 259. The servo signal processor 8 performs the sub-routine of FIG. 5 and determines a type of the disc, and then performs step 260 shown in FIG. 4C so as to determine whether the focus servo operation is proceeding.

The servo signal processor 8 informs the controller 9 of the discrimination result with respect to a type of the disc 1 in step 260, and then generates the focus control signal being as a focus-down state in step 270, and determines whether a focus zero cross (FZC) signal from the input focus error signal is detected in step 280. If the FZC signal is detected in step 280, the servo signal processor 8 determines that focus is just obtained at the moment when the focus error signal passes a zero point from a state out of zero, sets a focus state as "ON" in step 290, and finishes the focus search operation. If the FZC signal is not detected in step 280, the servo signal processor 8 determines whether the level of the output focus control signal is less than the minimum value $V_{min}$ in step 300. If the level of the focus control signal is not less than the minimum value $V_{min}$, the servo signal processor 8 determines a current focus search operation section as being a focus-down state and executes step 280. If the level of the focus control signal is less than the minimum value $V_{min}$, the servo signal processor 8 determines a current focus search operation section as being a focus-down completion state, generates a focus control signal for a focus-up state in step 310, and determines whether the level of the focus control signal generated is less than the maximum value $V_{max}$ in step 320. If the level of the focus control signal is not less than the maximum value $V_{max}$, the servo signal processor 8 determines a current focus search operation section as being a focus-up state and iterates step 320 until the level of the focus control signal reaches the maximum value $V_{max}$.

When the level of the output focus control signal reaches the maximum value $V_{max}$ in step 320, the servo signal processor 8 increases the number of the value (times) COUNT of a focus search operation by "1" in step 330, and determines whether the value of COUNT of the focus search operation reaches a predetermined number in step 340. In this embodiment, the number of times is set as "3". If the number of times COUNT of the focus search operation does not reach the predetermined number "3", the servo signal processor 8 again performs step 270. However, if the number of times COUNT of the focus search operation reaches the predetermined number "3", the servo signal processor 8 finishes the focus search operation.

Again returning to FIG. 1, when the servo signal processor 8 generates the control signal of a low level expressed as a binary signal of "0" based on the determination that the loaded disc is one of a single-layered DVD and a multi-layered DVD, the switch 45 of the RF amplification unit 5 receives the control signal, selects and outputs the RF signal waveform-equalized by the DVD waveform equalizer 15 to the digital signal processor 6. On the contrary, the switch 45 selects and outputs the RF signal waveform-equalized by the CD waveform equalizer 25 to the digital signal processor 6 when the servo signal processor 8 determines the loaded disc as a CD and generates the control signal of a high level expressed as a binary signal of "1".

The switch 16 of the digital signal processor 6 cooperates with the switch 45 of the RF amplification unit 5 so that the RF signal waveform-equalized by the DVD waveform equalizer 15 is output to the DVD signal processor 26 and the waveform-equalized RF signal by the CD waveform equalizer 25 is output to the CD signal processor 36. The DVD signal processor 26 and the CD signal processor 36 process the input waveform-equalized RF signals, respectively. The controller 9 performs the general control over the system so that a playback operation appropriate to the type of disc discriminated by the servo signal processor 8 is performed. The D/A converter 10 receives the focus control signal output through the output terminal OUT of the servo signal processor 8 and converts the focus control signal into an analog signal. The current amplifier 11 receives the analog focus control signal, converts the received signal into a signal in the form of a current and amplifies the converted signal at a predetermined magnitude, by which the optical pick-up 3 in the deck mechanism 2 is driven.

As described above, the present invention can quickly discriminate a type of a disc loaded on a turntable, using the times that reflection characteristic curves of a focus error signal are detected during performing an initial focus search operation for a CD, a single-layered DVD and a multi-layered DVD having different structures, thereby providing an effect that a playback operation of the disc can be performed without error.

While only certain embodiments of the invention have been specifically described herein, it will be apparent that numerous modifications may be made thereto without departing from the spirit and scope of the invention.

What is claimed is:

1. A method for discriminating a type of an optical disc loaded into a digital versatile disc system which can reproduce a plurality of optical discs having different signal record layers with a single optical pickup, the method for discriminating the type of the optical disc comprising the steps of:

(a) detecting a focus error signal having desired waveforms from a signal picked up from the loaded optical disc in a focus-up state during performing an initial focus search operation for the loaded optical disc;

(b) comparing a magnitude of the focus error signal in said step (a) with first and second predetermined reference values;

(c) determining which of a reflection characteristic curve having a minute level produced by reflection from a surface of a substrate of the loaded optical disc, a reflection characteristic curve having a magnitude between the first and second predetermined reference values produced by a reflection layer of the loaded optical disc, and a reflection characteristic curve having a magnitude larger than the first and second reference values forms the focus error signal detected in said step (a), based on the comparison result in said step (b), and setting the time elapsed after a start of a focus-up operation of the optical pickup;

(d) counting a number of times when the focus error signal detected in said step (a) is determined as the reflection characteristic curve having the magnitude between the first and second predetermined reference values in said step (c);

(e) comparing the number of times counted in said step (d) with a predetermined number, and the time elapsed set in said step (c) with a predetermined critical time, respectively, when the focus-up operation is completed; and (f) determining whether the loaded optical disc is a single-layered DVD, a multi-layered DVD or a CD, based on the comparison results in said step (e).

2. The method for discriminating a type of an optical disc according to claim 1, wherein said step (a) comprises the sub-steps of:

(a1) comparing an absolute magnitude of the input focus error signal with a predetermined noise reference value relating to noise;

(a2) calculating a waveform symmetry factor of the focus error signal when the absolute magnitude of the focus error signal is larger than the predetermined noise reference value, based on the comparison result in said step (a1);

(a3) comparing the waveform symmetry factor obtained in said step (a2) with a predetermined critical value; and (a4) determining the reflection characteristic curve when the waveform symmetry factor is within the critical value based on the comparison result in said step (a3), which forms the focus error signal of a desired waveform.

3. The method for discriminating a type of an optical disc according to claim 2, wherein said step (a2) comprises the step of calculating a difference between each of a maximum value and a minimum value of the focus error signal and the first and second predetermined reference values, and obtaining the waveform symmetry factor using a ratio of the calculated differences.

4. The method for discriminating a type of an optical disc according to claim 1, wherein a magnitude of the focus error signal in said step (b) is a difference between a maximum value and a minimum value of the focus error signal.

5. The method for discriminating a type of an optical disc according to claim 1, wherein said step (c):

determines the focus error signal as a reflection characteristic curve having a minute size produced by reflection from the surface of the substrate of the loaded optical disc and sets the time elapsed after a start of a focus-up operation to a first parameter, when a magnitude of the focus error signal is less than the first reference values, determines the focus error signal as a reflection characteristic curve produced by a reflection layer of one of a multi-layered DVD and a CD and sets the time elapsed after the start of the focus-up operation to a second parameter, when the magnitude of the focus error signal is larger than the first predetermined reference value and is less than the second predetermined reference values, and determines the focus error signal as a reflection characteristic curve having a large size produced by a reflection layer of a single-layered DVD and sets the time elapsed after the start of the focus-up operation to a third parameter, when a magnitude of the focus error signal is larger than the second predetermined reference value.

6. The method for discriminating a type of an optical disc according to claim 1, wherein said step (d) comprises the step of increasing the number of times of detection of the focus error signal by "1" when the magnitude of the focus error signal is a reflection characteristic curve having the magnitude between the first and second predetermined reference values, to discern between a multi-layered DVD and a CD.

7. The method for discriminating a type of an optical disc according to claim 6, wherein said step (d) further comprises the step of setting a fourth parameter to "1" when the focus error signal has the reflection characteristic curve having the minute level generated by reflection from the surface of the substrate of the loaded optical disc, and setting a fifth parameter to "1" when the focus error signal has the reflection characteristic curve having the magnitude larger than the first and second predetermined reference values.

8. The method for discriminating a type of an optical disc according to claim 7, wherein said step (e) further comprises the step of determining that the fourth and fifth parameters set in step (d) and the detection number of the focus error signal are all zero, to determine that no optical disc is loaded on the turntable before comparing the number of times counted in said step (d) and the time elapsed in said step (c) with the predetermined number and critical time, respectively.

9. The method for discriminating a type of an optical disc according to claim 1, wherein the predetermined number in step (e) is "2".

10. The method for discriminating a type of an optical disc according to claim 5, wherein said step (e) comprises the step of calculating the differential times between each of the times elapsed after a focus-up operation to the second and third parameters and the time elapsed after the start of the focus-up operation to the first parameter in step (c), and comparing the calculated differential times with the predetermined critical time.

11. The method for discriminating a type of an optical disc according to claim 10, wherein the predetermined critical time in said step (e) is set to the time from a point when the reflection characteristic curve of the minute level produced by reflection from the surface of the substrate is detected, to a middle point between the points when the reflection characteristic curves produced by the reflection layers of the single-layered DVD and the CD are detected, to distinguish a time that the focus error signal of the reflection characteristic curve is detected from the single-layered DVD and the CD, both of which have a single reflection layer in the focus-up state.

12. The method for discriminating a type of an optical disc according to claim 10, wherein said step (f) comprises the steps of:
   determining that the loaded optical disc is a multi-layered DVD when the counted number is the predetermined number;
   determining that the optical disc is a CD when the counted number is not the predetermined number and the differential times are larger than the critical time; and
   determining that the optical disc is a single-layered DVD when the counted number is not the predetermined number and the differential times are less than the critical time.

13. The method for discriminating a type of an optical disc according to claim 1, further comprising:
   (g) performing a focus servo operation, using a focus zero cross (FZC) signal which is detected from the focus error signal obtained in the focus-down state during performing the focus search operation for the loaded optical disc, if the type of the loaded optical disc is determined in said step (f).

14. The method for discriminating a type of an optical disc according to claim 13, wherein said step (g) performs the focus search operation by the predetermined number until the focus zero cross signal is detected from the focus error signal input in the focus-down state, and determines a focus-in state if the focus zero cross signal is detected.

15. A digital versatile disc (DVD) system for reading a data signal from a loaded optical disc, comprising:
   a compatible optical pick-up for DVD/CD, to read the data signal from the loaded optical disc;
   a focus error signal detector to detect a focus error signal from the data signal;
   a servo signal processor to generate a focus servo control signal for control of a focus servo operation of the optical pick-up, and to discriminate a type of the loaded optical disc, using a time and number of at least one reflection characteristic curve formed from the focus error signal detected by said focus error signal detector during an initial focus search operation;
   a controller to perform control over the DVD system so that a playback operation of the loaded optical disc is performed properly according to the discrimination result of the type of the loaded optical disc; and
   driving means for outputting a driving signal of said optical pick-up corresponding to the focus servo control signal of said servo signal processor.

16. The digital versatile disc (DVD) system according to claim 15, wherein said servo signal processor compares a size of the reflection characteristic curve of the focus error signal input from said focus error signal detector with predetermined reference values, during a focus-up state in performing the initial focus search operation for the loaded optical disc.

17. The digital versatile disc (DVD) system according to claim 16, wherein said servo signal processor determines whether the focus error signal corresponds to one of a reflection characteristic curve having a minute size produced by reflection from the surface of the optical disc substrate, a magnitude between the predetermined reference values produced by the reflection layer of the loaded optical disc, and a magnitude larger than the predetermined reference values, based on the comparison of the size of the reflection characteristic curve of the focus error signal with the predetermined reference values,
   sets a time elapsed after a start of a focus-up operation to a first parameter in response to recognizing the focus error signal being represented as the reflection characteristic curve having the minute size produced by reflection from the surface of the loaded optical disc substrate,
   counts the detection number of the focus error signal and sets a time elapsed after the start of the focus-up operation to a second parameter in response to recognizing the focus error signal being represented as the reflection characteristic curve having the size between the predetermined reference values and caused by the reflection layer of the loaded optical disc according to the judgment result, and
   sets a time elapsed after the start of the focus-up operation to a third parameter in response to recognizing the focus error signal being represented as the reflection characteristic curve having the size larger than the predetermined reference values and caused by the reflection layer of the loaded optical disc.

18. The digital versatile disc (DVD) system according to claim 17, wherein said servo signal processor compares the counted detection number with a predetermined number and the set elapsed time with a predetermined critical time, respectively, in response to the completion of the focus-up state.

19. The digital versatile disc (DVD) system according to claim 18, wherein said servo signal processor checks whether the counted detection number is "2", and judges the loaded optical disc to be a multi-layered DVD having a plurality of reflection layers if the counted number is "2".

20. The digital versatile disc (DVD) system according to claim 19, wherein said servo signal processor determines differential times between the times elapsed after the start of the focus-up operation to the second and third parameters and the time elapsed after focus-up to the first parameter if the counted number is not "2", and judges that the loaded optical disc is a CD if the differential times are larger than the predetermined critical time, and judges that the optical disc is a single-layered DVD if the differential times are less than the predetermined critical time.

21. A reproduction system for reproducing data from a loaded optical recording medium and compatible with optical recording media of different types, the reproduction system comprising:
   an optical pick-up to read the data from the loaded optical recording medium;
   a focus error signal detector to detect a focus error signal from the data read by the said optical pick-up; and
   a servo signal processor to generate a focus control signal for controlling a focus servo operation of the optical pick-up, and to discriminate the type of the loaded optical recording medium based upon a timing of a particular characteristic of the focus error signal during an initial focus operation.

22. A reproduction system as claimed in claim 21, wherein said servo signal processor discriminates the type of the loaded optical recording medium based upon the timing and a number of the particular characteristics of the focus error signal during the initial focus operation.

23. A reproduction system as claimed in claim 21, wherein the particular characteristic of the focus error signal is a reflection characteristic curve.

24. A reproduction system as claimed in claim 22, wherein the particular characteristic of the focus error signal is a reflection characteristic curve.

25. A reproduction system as claimed in claim 24, wherein said servo signal processor compares a magnitude of each reflection characteristic curve with a first predetermined value, determines one of the reflection characteristic curves to have a magnitude less than the first predetermined value at a first time, compares each following reflection characteristic curve with a second predetermined value, counts a number of the following reflection characteristic curves having magnitudes between the first and second predetermined values during a focus-up state of the optical pick-up, determines the loaded optical recording medium to be a multiple-sided DVD if the number of the following reflection characteristic curves having magnitudes between the first and second predetermined values is greater than one, then determines the loaded optical recording medium to be a CD if the magnitude of the following reflection characteristic curve is between the first and second predetermined values and the timing of the following reflection characteristic curve is greater than a predetermined critical time from the first time, and determines the loaded optical recording medium to be a single-sided DVD if the magnitude of the following reflection characteristic curve is greater than the second predetermined value and the timing of the following reflection characteristic curve is less than a predetermined critical time from the first time.

26. A reproduction system as claimed in claim 23, wherein said servo signal processor compares a magnitude of each reflection characteristic curve with a first predetermined value, determines one of the reflection characteristic curves to have a magnitude less than the first predetermined value at a first time, determines the loaded optical recording medium to be a CD if the timing of the following reflection characteristic curve is greater than a predetermined critical time from the first time, and determines the loaded optical recording medium to be a single-sided DVD if the timing of the following reflection characteristic curve is less than a predetermined critical time from the first time.

27. A reproduction system as claimed in claim 24, wherein said servo signal processor compares a magnitude of each reflection characteristic curve with at least one of first and second predetermined values during a focus-up state of the optical pick-up, determines whether each reflection characteristic curve is a first kind having a magnitude produced by reflection from a surface of a substrate of the optical recording medium, a second kind having a magnitude between the first and second predetermined values, and a third kind having a magnitude larger than the first and second predetermined value, counts a number of the second kind of reflection characteristic curves, counting an elapsed time from detection of the first kind of reflection characteristic curve, and determines the type of the loaded optical disc based upon the number and the elapsed time.

28. A reproduction system as claimed in claim 26, wherein said servo signal processor determines the loaded optical recording medium to be a multiple-sided DVD if the number of second kind of reflection characteristic curves is greater than one, determines the loaded optical recording medium to be a CD if the number of second kind of reflection characteristic curves is one and the elapsed time to the detection of the second kind of reflection characteristic curve is greater than a predetermined critical time, and determines the loaded optical recording medium to be a DVD if the number of second kind of reflection characteristic curves is one and the elapsed time to the detection of the second kind of reflection characteristic curve is less than the predetermined critical time.

29. A reproduction system as claimed in claim 21, further comprising:
    a controller to control a playback operation of the reproduction system based upon the discriminated type of the loaded optical recording medium; and
    a driving unit to output a driving signal for the optical pick-up based upon the focus control signal.

30. A reproduction system as claimed in claim 24, further comprising:
    a controller to control a playback operation of the reproduction system based upon the discriminated type of the loaded optical recording medium; and
    a driving unit to output a driving signal for the optical pick-up based upon the focus control signal.

31. A reproduction system as claimed in claim 30, further comprising:
    a current-to-voltage amplifier to convert a current form of the data to a voltage signal;
    a DVD waveform equalizer to equalize the voltage signal according to a DVD format;
    a CD waveform equalizer to equalize the voltage signal according to a CD format;
    a switching unit to selectively output the equalized voltage signals according to the DVD and CD format, based upon a type control signal;
    a DVD signal processor to process the equalized voltage signal according to the DVD format output through said switching unit; and
    a CD signal processor to process the equalized voltage signal according to the CD format output through said switching unit;
    wherein said servo signal processor outputs the type control signal based upon the discriminated type of the loaded optical recording medium.

32. A reproduction system as claimed in claim 21, wherein the particular characteristic is a predetermined waveform.

33. A reproduction system as claimed in claim 24, wherein the particular characteristic is a predetermined waveform.

34. A reproduction system as claimed in claim 22, wherein said servo signal processor discriminates the type of the loaded optical recording medium based upon the timing, magnitude and a number of the particular characteristics of the focus error signal during the initial focus operation.

35. A method of reproducing data from a loaded optical recording medium and compatible with optical recording media of different types, the method comprising the steps of:
    (a) reading the data from the loaded optical recording medium;
    (b) detecting a focus error signal from the data; and (c) determining the type of the loaded optical recording medium based upon a timing of a particular characteristic of the focus error signal during an initial focus operation.

36. The method as claimed in claim 35, wherein said step (c) further comprises the step of determining the type of the loaded optical recording medium based upon the timing and magnitudes of the particular characteristic of the focus error signal during the initial focus operation.

37. The method as claimed in claim 36, wherein said step (c) further comprises the steps of:

(c1) determining whether a magnitude of each instance of the particular characteristic is below a first predetermined value, between the first and a second predetermined value, or above the second predetermined value, during a focus-up operation;

(c2) determining a first timing of the particular characteristic that is below the first predetermined value as a first time;

(c3) counting a number of times of each instance that the particular characteristic is between the first and second predetermined values during the focus-up operation;

(c4) determining the loaded optical disc to be a multiple-sided DVD if the number of times is greater than one;

(c5) determining the loaded optical disc to be a CD if the number of times is one and an elapsed time of a second timing of the particular characteristic from the first time is greater than a critical time; and (c6) determining the loaded optical disc to be a single-layered DVD if the particular characteristic is above the second predetermined value and an elapsed time of a third timing of the particular characteristic from the first time is less than the critical time.

38. The method as claimed in claim 35, wherein said step (b) comprises the steps of:

(b1) making the particular characteristic be a reflection characteristic curve;

(b2) comparing an absolute magnitude of the focus error signal with a predetermined noise reference value relating to noise;

(b3) holding maximum and minimum values of the focus error signal if the absolute magnitude of the focus error signal is at least as great as the predetermined noise reference value;

(b4) calculating a waveform symmetry factor D of the focus error signal when the absolute magnitude of an instance of the reflection characteristic curve is greater than the predetermined noise reference value according to the following formula:

$$D=(MAX-V_R)/(V_R-MIN),$$

where MAX and MIN are the maximum and minimum values of the focus error signal, respectively, and $V_R$ is a reference voltage;

(b5) comparing the waveform symmetry factor with a predetermined critical value; and (b6) determining the focus error signal to have a reflection characteristic curve as the particular characteristic in response to the waveform symmetry value being within the critical value.

39. The method as claimed in claim 37, further comprising the step of setting the critical time to be a time period from detection of the instance that the particular characteristic is below the first predetermined value to an average time between expected times that the particular characteristics should be produced by reflection layers of the single-layered DVD and the CD.

40. The method as claimed in claim 38, further comprising the step of setting the critical time to be a time period from detection of the instance that the particular characteristic is below the first predetermined value to an average time between expected times that the particular characteristics should be produced by reflection layers of the single-layered DVD and the CD.

41. The method as claimed in claim 37, further comprising the step of:

(d) performing a focus servo operation, using a focus zero cross (FZC) signal determined from the focus error signal obtained in the focus-down state during a focus search operation, if the type of the loaded optical disc is determined in one of said steps (c3)–(c5).

42. The method as claimed in claim 41, wherein said step (d) further comprises the steps of:

(d1) changing from a focus-up state to a focus-down state if the type of the loaded optical disc is determined in one of said steps (c3)–(c5);

(d2) repeatedly switching between the focus-down state and the focus-up state until the FZC signal is determined, and counting a number of times a change is made between the focus-up and focus-down states; and (d3) stopping the performance of said step (e) in response to the number of times a change is made reaching a predetermined limit.

43. A method of reproducing data from a loaded optical recording medium and compatible with optical recording media of different types, the method comprising the steps of:

(a) reading the data from the loaded optical recording medium;

(b) detecting a focus error signal from the data; and (c) determining the type of the loaded optical recording medium based upon different sizes and positions of reflection characteristic curves of the focus error signal.

* * * * *